United States Patent [19]

Balland

[11] Patent Number: 4,813,701

[45] Date of Patent: Mar. 21, 1989

[54] FOLDABLE CARRIAGE AND TRANSPORT APPARATUS

[75] Inventor: Denis Balland, Rambervillers, France

[73] Assignee: Societe d'Equipement Menager Industriel et Commercial S.E.M.I.C.O., Saint Cloud, France

[21] Appl. No.: 868,626

[22] Filed: May 29, 1986

[30] Foreign Application Priority Data

May 29, 1985 [FR] France ................... 85 08034
Sep. 27, 1985 [FR] France ................... 85 14370

[51] Int. Cl.$^4$ .............................................. B62B 3/02
[52] U.S. Cl. .................................................. 280/641
[58] Field of Search .......... 280/39, 641, 642, 33.99 H, 280/646, 651, 655, 47, 43.17, 659, 33.99 R

[56] References Cited

U.S. PATENT DOCUMENTS

| | | | |
|---|---|---|---|
| 2,470,040 | 5/1949 | Mackin et al. | 280/47.38 |
| 3,118,553 | 1/1964 | Rosenzweig | 280/651 |
| 3,854,899 | 1/1975 | Bontrager | 280/641 |
| 4,506,907 | 3/1985 | Miyagi | 280/642 |

FOREIGN PATENT DOCUMENTS

| | | |
|---|---|---|
| 0090668 | 5/1983 | European Pat. Off. . |
| 1179194 | 1/1970 | United Kingdom . |
| 2113625 | 10/1983 | United Kingdom . |

Primary Examiner—John A. Pekar
Assistant Examiner—Richard Camby
Attorney, Agent, or Firm—Bachman & LaPointe

[57] ABSTRACT

Apparatus suitable for the carriage and transport of relatively large objects such as cartons or pieces of furniture and also for carrying loose items such as varied purchases in a large self-service store. This apparatus has a folded condition and a deployed condition and comprises base means presenting first and second end portions, at least one first wheel mounted to support said first end portion of said base means, at least two second wheels, wheel support members extending pivotably outwards from said base means to connect said second wheels to said second portion of said base means whereby said second wheels support said second portion of said base means and said deployed condition, at least two lateral upright members projecting upwards from said second end portion of said base means in said deployed condition and mounted pivotably to said second end portion, and coupling means for coupling said lateral upright members with said wheel support members respectively for pivoting in opposite directions at relative speeds such that when said upright members are pivoted through a first angle to a position juxtaposed with said first end portion of said base means in said folded condition, said wheel support means are pivoted through a second angle in the opposite direction to a position juxtaposed with said base means.

14 Claims, 17 Drawing Sheets

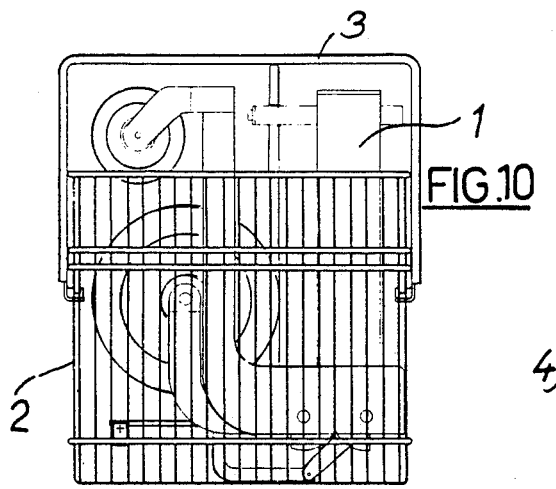
FIG.10
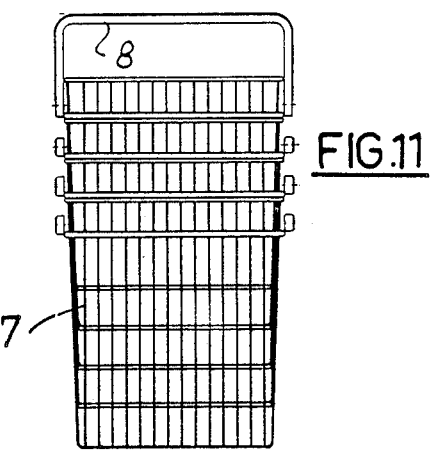
FIG.11
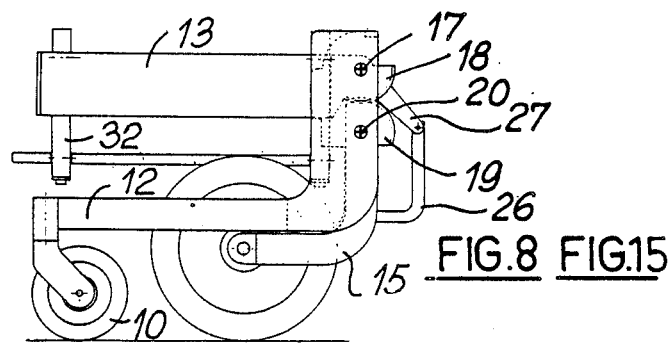
FIG.8 FIG.15
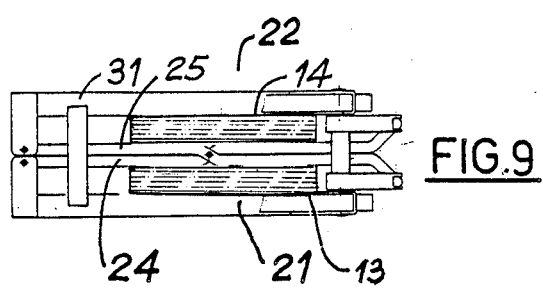
FIG.9
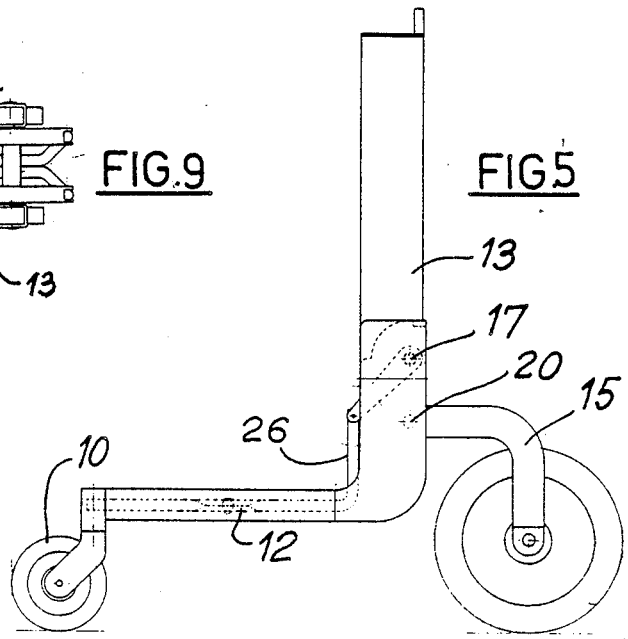
FIG.5
FIG.16

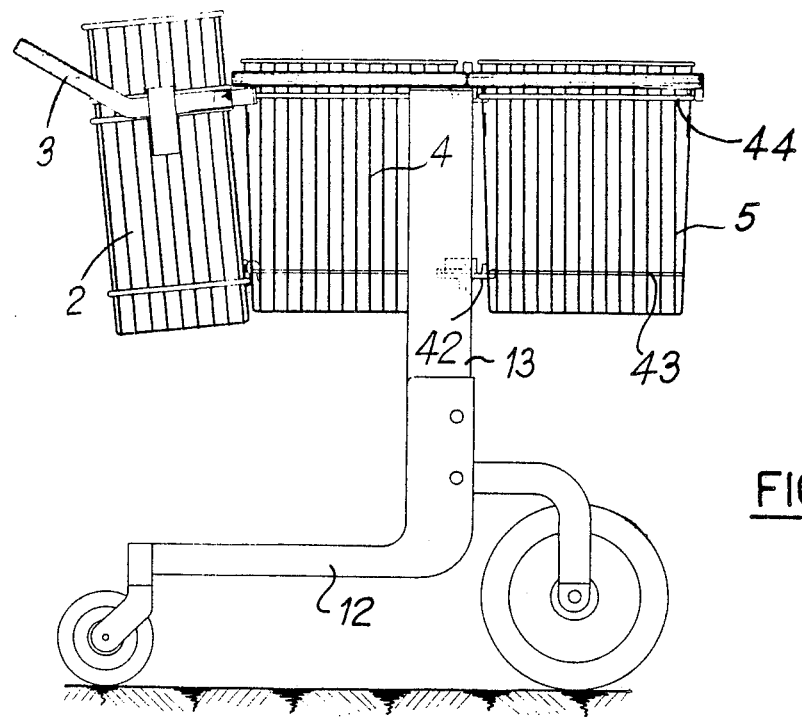
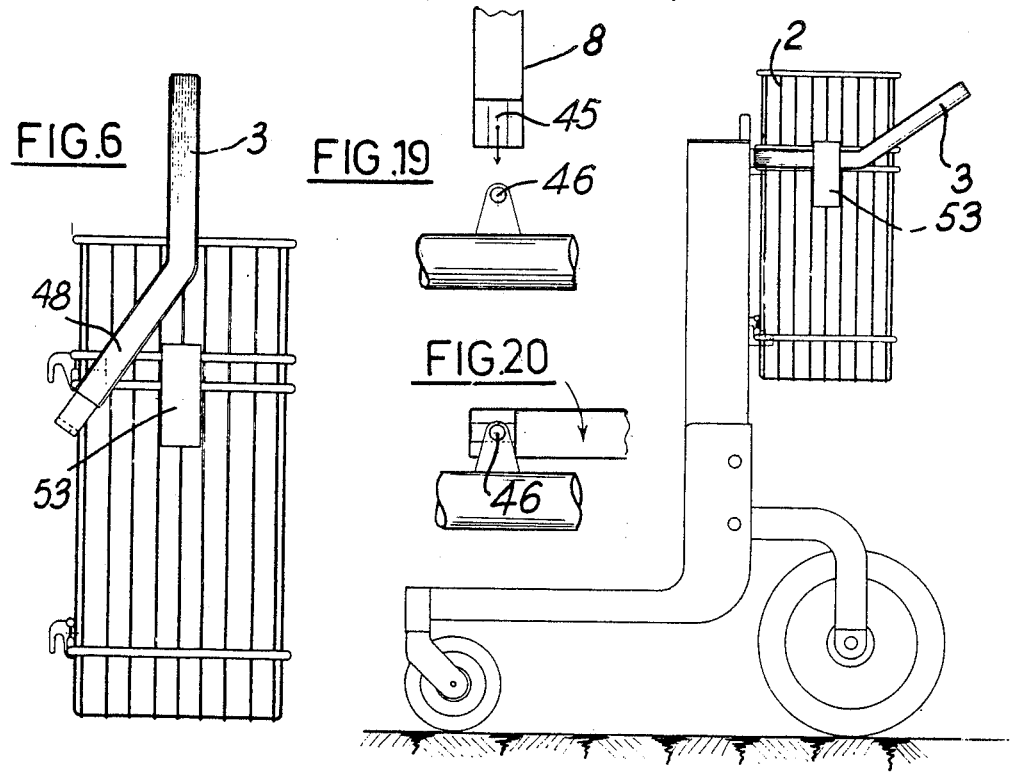

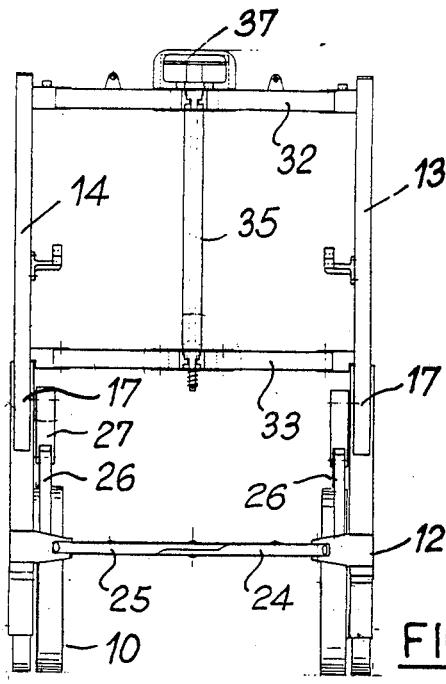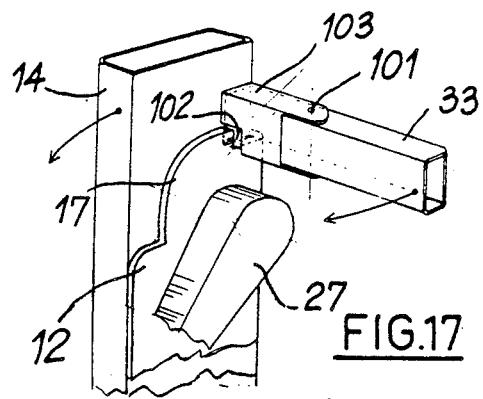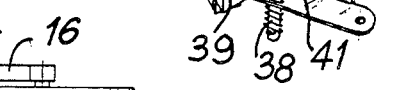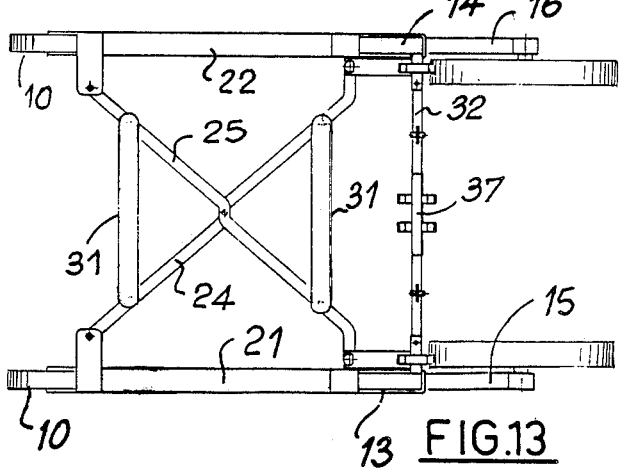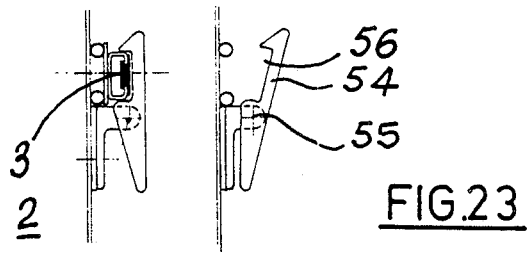

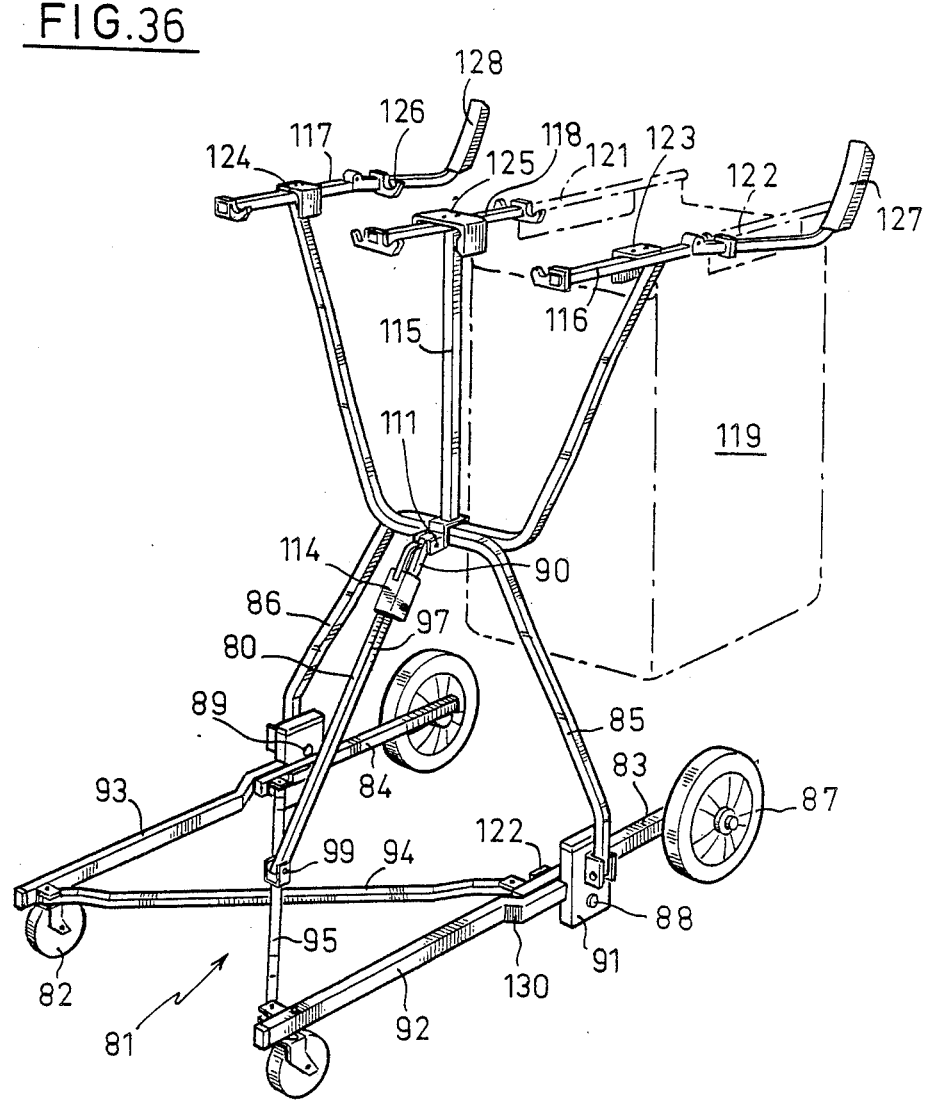

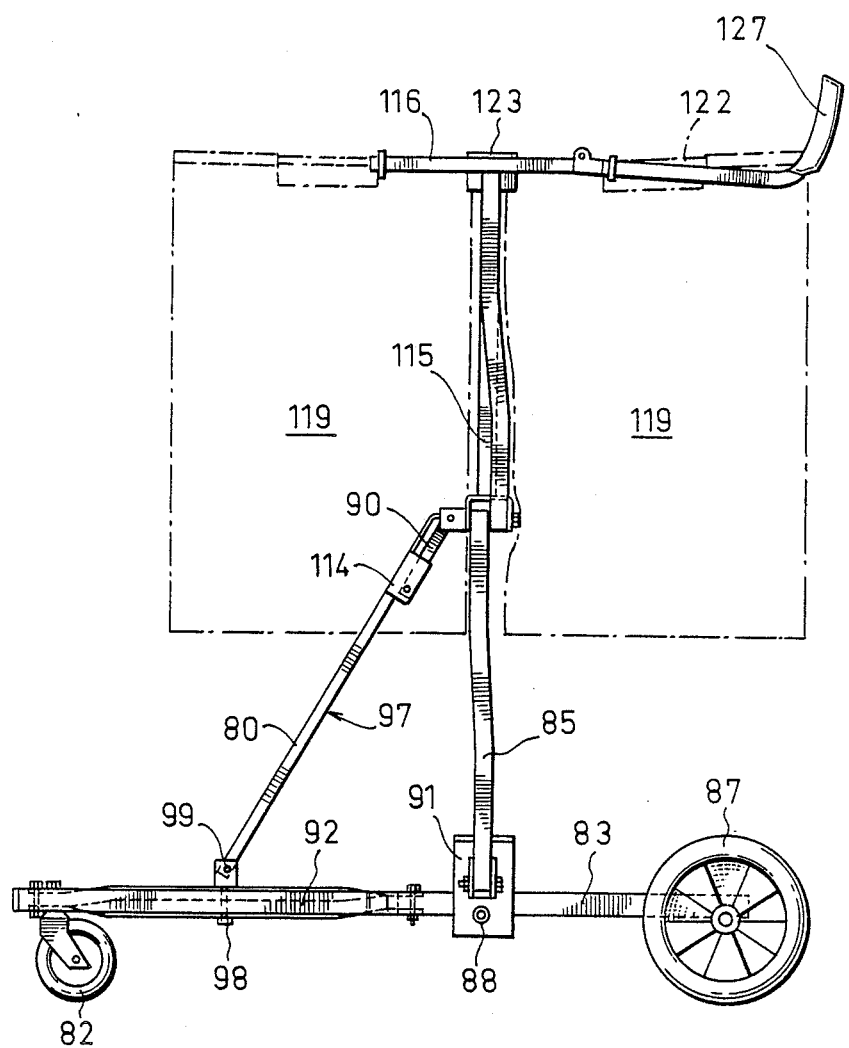

FIG.41
FIG.42
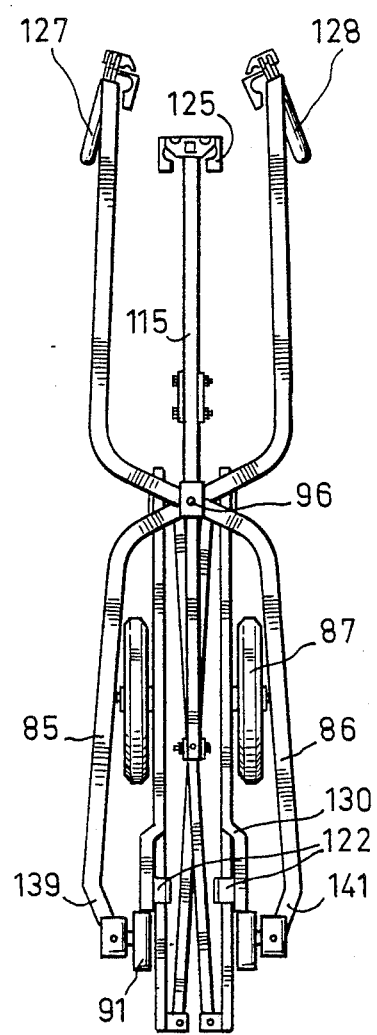
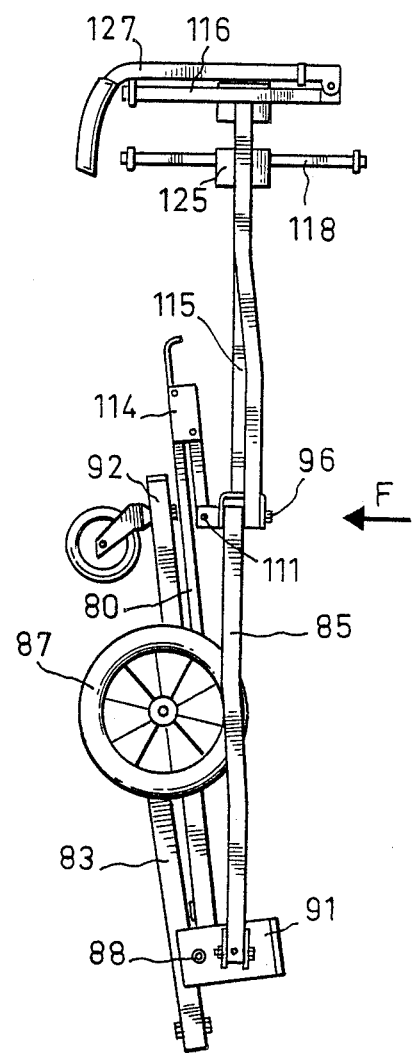

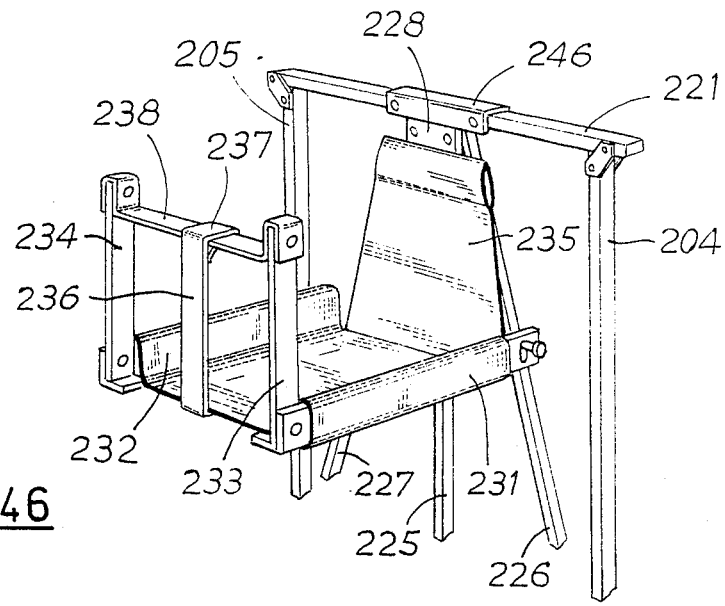
FIG.46
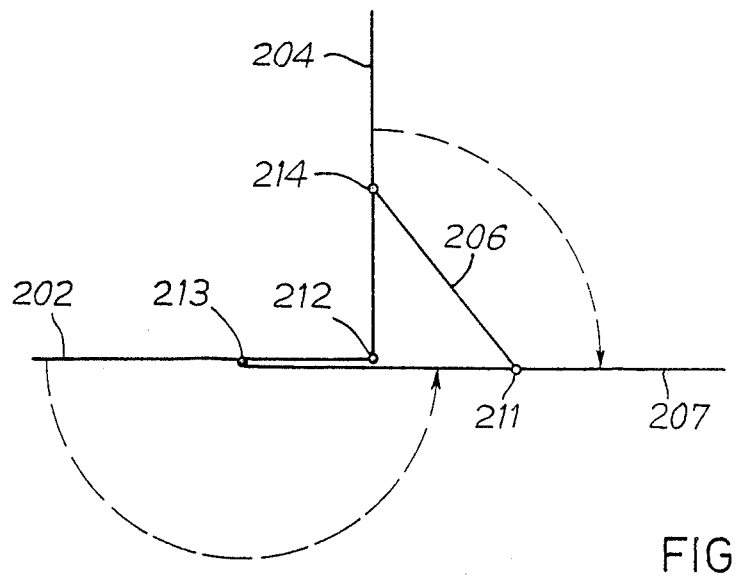
FIG.47
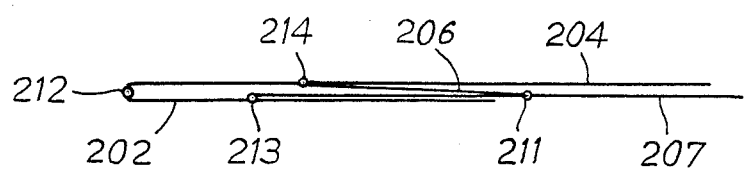

FOLDABLE CARRIAGE AND TRANSPORT APPARATUS

BACKGROUND OF THE INVENTION

This invention relates to apparatus suitable for the carriage and transport of relatively large objects such as cartons or pieces of furniture and also for carrying loose items such as varied purchases in a large self-service store.

For transporting large objects, it is desirable to have apparatus such as a trolley which facilitates the transport of objects which are large or heavy or both, such as household white goods. Such apparatus is usually only used rarely and it is preferable for it to be foldable so as to occupy a reduced space when not in use.

Another major problem is the carriage and transport of purchases in a large store. Currently, large self-service stores make large capacity caddies available to customers so that they can collect their loose purchases therein. When the customer passes the cash desk, the store often supplies plastic bags in which purchases can be placed as and when they are registered. The plastic bags are neither very strong nor very practical as the user must carry them from the caddy supplied by the store to his vehicle and then carry them from the boot of his vehicle to his home, and the distances can be quite long, depending on the available car parking. It would be desirable for users to have a transport apparatus for carrying their purchases without great effort from their vehicle to their home when the distance is long.

Moreover, the caddies supplied by the self-service stores may be taken outside the boundaries of the store and the stores have to renew a large part of their park of caddies each year; also, the caddies can cause damage to vehicles in the car park of the store when they are abandoned in unsuitable places.

A device to reduce theft of caddies which also enables the unused caddies to be fixed in specific places consists of hooking the caddies to a fixing system which is freed by a coin, for example a ten franc coin. Such a device is not effective to make a major reduction in theft of the caddies supplied by the store.

OBJECTS OF THE INVENTION

An object of the invention is to provide a foldable apparatus for the carriage and transport of articles.

Another object of the invention is to provide a transport apparatus for carrying both large objects and numbers of loose objects.

Yet another object of the invention is to provide a foldable apparatus which can be folded to occupy a small volume and taken hom in the vehicle to be used for transporting carrying and transporting goods between a store and the vehicle and between the vehicle and the home.

BRIEF DESCRIPTION OF THE INVENTION

The present invention provides an apparatus for the carriage and transport of goods having a folded condition and a developed condition, the apparatus comprising base means presenting first and second end portions, at least one first wheel mounted to support said first end portion of said base means, at least two second wheels, wheel support members extending pivotably outwards from said base means to connect said wheels to said second portion of said base means whereby said second wheels support said second portion of said base means in said deployed condition, at least two lateral upright members projecting upwards from said second end portion of said base means in said deployed condition and mounted pivotably to said second end portion, and coupling means for coupling said lateral upright members with said wheel support members respectively for pivoting in opposite directions at relative speeds such that when said upright members are pivoted through a first angle to a position juxtaposed with said first end portion of said base means in said folded condition, said wheel support means are pivoted through a second angle in the opposite direction to a position juxtaposed with said base means.

Preferably, said coupling means controls said angles whereby said second angle is substantially twice as big as said first angle.

In a preferred embodiment of the invention, said coupling means comprises hinge means by which said wheel support members are mounted pivotably on said base means and on said lateral upright members respectively, and rod members connecting said upright members pivotably with said base means, said hinge means being substantially aligned with the connection of said rod members with said base means in said deployed condition.

Preferably, said base means comprise first and second lateral bars, first and second diagonal members joined pivotably at the middle and each being connected pivotably at one end to said lateral bars and at the other end to said lateral upright members respectively.

DESCRIPTION OF THE DRAWINGS

Other features and advantages of the invention will appear from the following description, given by way of example, with reference to the accompanying drawings, in which:

FIG. 5 is a side view of a carriage in the apparatus of FIGS. 1 to 4;

FIG. 6 is a side view of a main basket for use with the carriage of FIG. 5;

FIG. 7 is a side view of the carriage of FIG. 5 with the basket of FIG. 6 mounted thereon to form a trolley, the basket providing a member by which the trolley can be manoeuvred;

FIG. 8 is a side view of the carriage of FIG. 5 in a folded condition;

FIG. 9 is a plan view of the folded carriage of FIG. 8;

FIG. 10 is a front view of the folded carriage placed in the basket of FIG. 6;

FIG. 11 is a front view of supplementary baskets for use with the carriage of FIG. 5 stacked one within the other;

FIG. 12 is a side view of the complete apparatus with the carriage of FIG. 5 and the baskets of FIGS. 6 and 11 for use as a caddy;

FIGS. 13 and 14 are respectively plan and front views of the carriage of FIG. 5;

FIGS. 15 to 18 are scrap views of details of the carriage of FIG. 5;

FIGS. 19 and 20 are scrap view of details of locking means for securing the supplementary baskets on the carriage;

FIG. 23 is a scrap view of locking means for securing the main basket to the carriage;

FIG. 31 is a partial perspective view of the apparatus of FIG. 27 showing the fixing of the baskets to the carriage;

FIG. 32 is a partial side view of a configuration of the apparatus of FIG. 27 for use as a trolley;

FIG. 35 is a partial side view of a configuration of the apparatus of FIG. 27 including a baby seat;

FIG. 36 is a perspective view of another carriage in a transport apparatus in accordance with another embodiment of the invention;

FIG. 37 is a side view of the carriage of FIG. 36;

FIGS. 41 and 42 are respectively plan and side views of the carriage of FIG. 36 in a fully folded condition;

FIG. 46 is a partial perspective view of the carriage of FIG. 44 with a baby seat secured thereto; and FIG. 47 is a schematic diagram showing the hinge system of the carriage of FIG. 44.

DESCRIPTION OF EMBODIMENTS OF THE INVENTION

The first embodiment of the invention comprises apparatus for the carriage and transport of goods, shown in FIGS. 1 to 4 in different configurations of use. The apparatus comprises a foldable carriage 1 shown in more detail in FIG. 5 and one or more baskets, such as the main basket 2 shown in FIG. 6. The main basket 2 may be secured on the carriage 1 as shown in FIG. 7 to form a handle by which the apparatus may be gripped and manoeuvred; in this case the main basket 2, which of generally parallelopiped shape, is fixed transversely on the carriage and the handle 3 of the basket provides the handle for manipulating the carriage.

The carriage 1 may be folded as shown in Figs. 8 and 9 and, when folded, its outer dimensions are all slightly less than the inside dimensions of the main basket 2 so that when folded the carriage 1 may be stored inside the basket 2 as shown in FIG. 10.

For transporting loose goods, in particular for transporting small purchases in a self-service store, the apparatus includes supplementary baskets 4 to 7 which can also be fixed onto the carriage when the carriage is in its condition of use, that is to say unfolded; these supplementary may be stacked together as shown in FIG. 11 so that the complete apparatus may be reduced to two items : the main basket 2 containing the folded carriage 1 and the set of four baskets 4 to 7 stacked and coupled together; these two items as shown in FIGS. 10 and 11 are readily transported by a single person.

The various baskets comprise respective handles, including a handle 3 for the main basket 2 and handles such as 8 for the supplementary baskets 4 to 7, the handles being mounted pivotingly on the baskets for movement between a vertical carrying position and a horizontal position by which the basket may be locked in position on the carriage 1.

Figure 1:
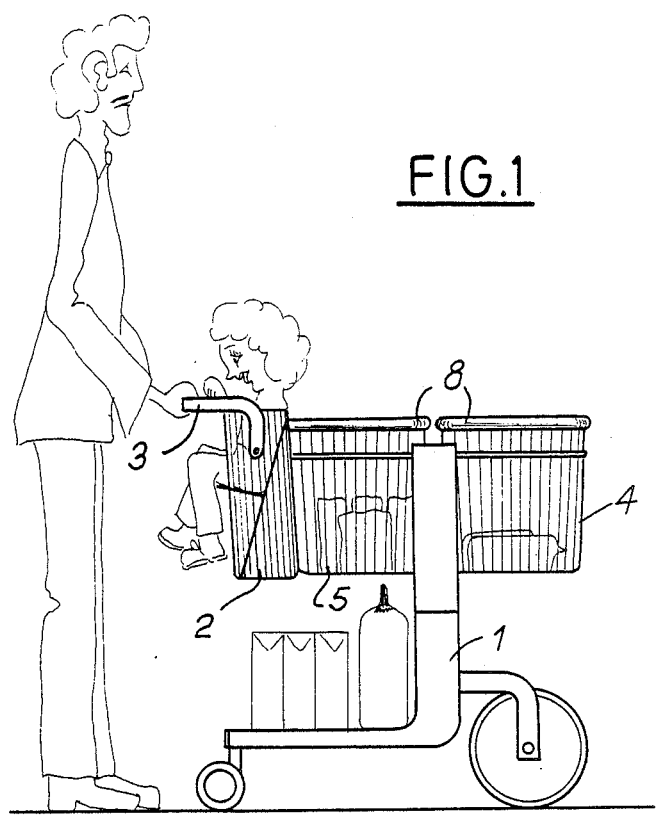
FIG. 1 is a side view of a transport apparatus in accordance with a first embodiment of the invention, used for the transport of purchases in a shop or store.
Figure 2:
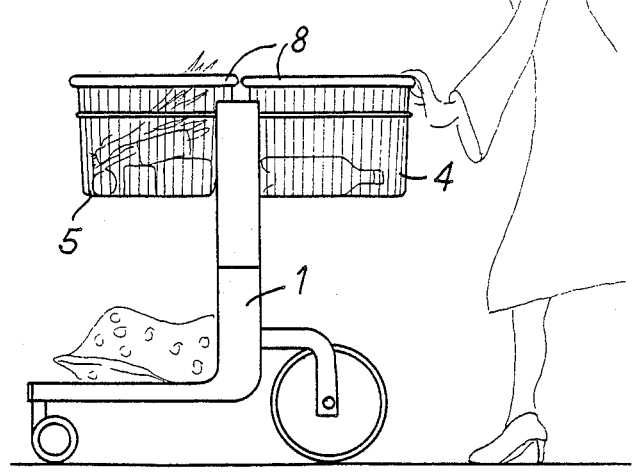
FIG. 2 is a side view of another configuration of the apparatus shown in FIG. 1 for transporting purchases in a store
Figure 3:
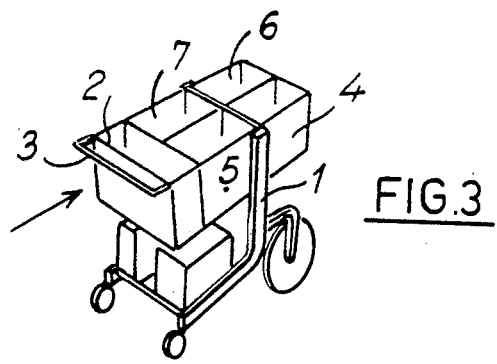
FIG. 3 is a perspective view of another configuration of the apparatus of FIG. 1 with a different arrangement of baskets for use in a store.
Figure 4:
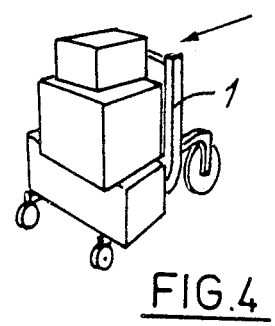
FIG. 4 is a perspective view of yet another configuration of the apparatus of FIG. 1 used as a trolley for transporting voluminous goods.

As shown in FIGS. 1 to 3, the supplementary baskets 4 to 7 are of generally rectangular shape and may be fixed in pairs on the carriage 1 extend longitudinally in the direction of movement of the carriage side by side. In the configurations of use shown in FIGS. 1 to 3, the handles 8 of the baskets 4 to 7 are folded down and outwards and at least the exposed upper sides of the handles comprise means for protecting the handles against shocks, such as a plastics covering; the handle 3 of the main basket 2 has a similar plastics covering 11.

As shown in FIGS. 1 and 12, in the configuration where the supplementary baskets 4 to 7 are used on the carriage 1, the main basket 2 may be fixed transversely on the short sides of a pair of the supplementary baskets 4 and 5, instead of being fixed on the carriage directly, the handle 3 being folded down and locking the main basket 2 in position on the supplementary baskets 4 and 5. In this way, a complete caddy is obtained comprising five baskets which represents a large volume suitable for use in a self-service store; the carriage 1 may also include a tray at a lower level, as shown in FIGS. 1 and 2 on which goods may be placed also.

FIGS. 13 to 15 show an embodiment of the carriage 1 in more detail. In this embodiment, the carriage 1 comprises a base 12, a pair of wheels 10 which form the rear wheels of the carriage when used as a caddy in a store as shown in FIGS. 1, 3 and 12, two vertical lateral uprights 13 and 14 which are mounted pivotably on the base 12, and two supports for front wheels 15 and 16 which are also mounted pivotably on the base 12. The lateral uprights 13 and 14 are mounted to pivot about a horizontal transverse axis 17 and the wheel supports 15 and 16 are mounted to pivot about an axis 20 parallel to the axis 17, as shown in FIG. 8.

In accordance with this embodiment of the invention, the vertical lateral uprights 13 and 14 and the respective wheel supports 15 and 16 are connected to pivot together in opposite directions on the base 12. In the embodiment illustrated, the connections on each side are obtained by means of two toothed soctors 18 and 19 which are solid with the lateral upright and the wheel support respectively and mesh together. In this way, when the lateral upright 13 or 14 pivots down towards the base 12, that is to say to the left as shown in FIG. 5, the corresponding wheel support 15 or 16 pivots in the opposite direction so as to fit under the base 2. In this manner, the overall longitudinal size of the folded carriage is reduced since its length is practically the length of the base 12.

The opposed pivoting could be obtained by other means, for example a set of linkages connecting the lateral upright with the wheel support.

As shown particularly in FIGS. 13 and 14, the base 12 comprises two horizontal lateral bars 21 and 22 each of which bears a respective turnable wheel 10 at one end, the other end being bent in an L-shape to receive the axes 17 and 20. On the two horizontal bars 21 and 22, two diagonal members 24 and 25 are mounted for pivoting about respective vertical axes and are connected together pivotingly at their mid-points; the diagonals 24 and 25 are pivoted to the rear ends of the bars 21 and 22, that is to say the end bearing the wheels 10, and are connected at their front ends to the uprights 13 and 14 so as to be moved forwards, towards the wheel supports 15 and 16 when the uprights 13 and 14 are lowered on folding the carriage. In the embodiment shown this connection is obtained by a respective upward projection 26 on the front end of the diagonal 24 and 25 which is secured for rotation about a horizontal axis to a respective linkage 27 solid with the upright 13 or 14. In the example illustrated, each linkage 27 bears a horizontal axis 28 of square section which engages in a mating square section hole 29 in the corresponding toothed sector 18 which is solid with the lateral upright 13 or 14. This linkage is shown exploded in FIG. 16 in which appears the end of the projection 26 of the diagonal 24 or 25.

The diagonals 24 and 25 advantageously bear flexible bands 31 extending transversely and each fixed at both ends to the diagonals 24 and 25 so as to form a platform on which voluminous articles can be placed, as shown in FIGS. 1 to 4.

The two lateral uprights 13 and 14 are connected by two horizontal transverse bars 32 and 33, each formed by two symmetrical parts, and disposed substantially at respective ends of the uprights 13 and 14. Each of the bars 32 and 33 is mounted at its outer ends to pivot about a vertical axis on a respective block 103 which is solid with the corresponding upright 13 or 14, and also comprises a central toggle type hinge which enables the bar to fold rearwards, towards the wheels 10.

Advantageously, the carriage is lockable in its unfolded condition, that is to say the condition for use, by locking means locking the two bars 32 and 33 in their fully unfolded positions, that is to say when their two parts are aligned with each other and they extend in the same plane. At this moment, the two uprights 13 and 14 are simultaneously locked in their vertical unfolded positions, maintaining them also in the same vertical plane as the unfolded horizontal bars 32 and 33. This is achieved by the outer ends of each of the two parts of the horizontal traverse 33 abutting on the side of a notch made in the upper rear part of the base 12, and by a complementary locking mechanism provided at the inner ends of each part of both the bars 32 and 33.

As shown in FIG. 14 and in FIGS. 16 and 18, which are detail views showing the hinging of the lower horizontal bar 33 on the upright 13, and the locking mechanism in use, the two horizontal bars 32 and 33 are connected by a vertical rod 35 onto which they are secured to pivot about vertical axes, as shown in FIG. 18. The vertical rod 35 is hollow and comprises a sliding part 36 having a grip 37 at its upper end. This sliding part 36 is biased downwardly by a spring 38; the inner ends of the two parts of each bar 32 and 33 comprise shaped ends 39 which lock behind a bolt 41 solid with the lower end of the vertical rod 35. As shown in FIG. 18, when the carriage is deployed, the shaped end 39 pushes the bolt 41 upwards and engages behind the bolt 41 when the bolt returns down to lock the bars so as to secure the carriage.

To fold the carriage, it is sufficient to raise the grip 37, which lifts the rod 35 and with it the bolts 41 to disengage from the shaped ends 39, and the uprights 13 and 14 and the mid-parts of the bars 32 and 33 can then be pushed rearwards together; this rearwards movement causes the opposite rotation of the wheel supports 15 and 16 and the forward displacement of the ends of the diagonals 24 and 25, which closes the carriage by bringing the two side bars of the base 12 together so that the folded carriage is as shown in FIG. 8.

As indicated above, the handles 8 of the supplementary baskets 4 to 7 serve to lock the baskets in position on the carriage when in the horizontal position. As shown in the drawings and in particular in FIG. 12, the supplementary baskets 4 to 7 are hooked onto the horizontal bars 32 and 33 by means of hooks 42 solid with the bars which engage horizontal frame members 43 and 44 of the baskets.

To lock the baskets onto the carriage, each handle 8 of the baskets 4 to 7 comprises at each end, beyond its pivot axis on the basket a central longitudinal slot 45; as shown in FIGS. 19 and 20, this slot is placed on a peg 46 solid with the upper horizontal bar 32 and when the handle is lowered (see FIG. 20), the peg is locked in the slot 45 which has rotated a quarter of a turn so as to lock the basket on the upper bar 32.

Figure 22:
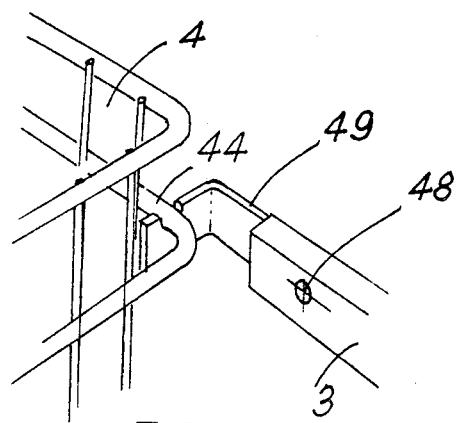
FIG. 22 is a scrap view of the fixings for the main basket on a supplementary basket.
Figure 21:
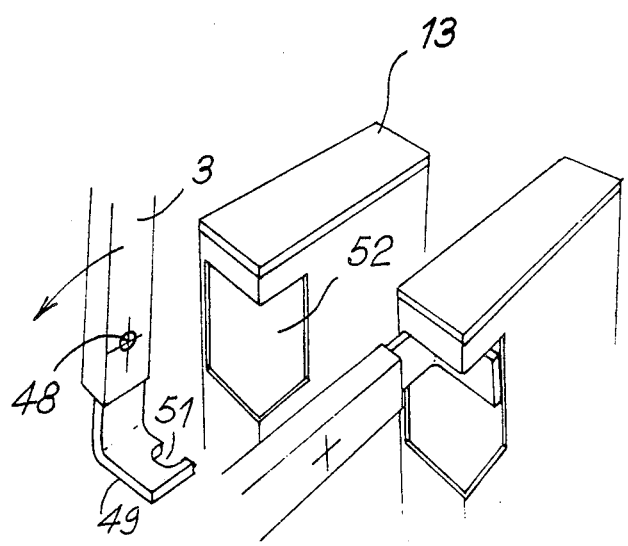
FIG. 21 is a scrap view of the fixings for the main basket to the carriage.

As shown particularly in FIG. 6, the handle 3 of the main basket 2 is slightly bent to form to equal arms and it is hinged about a horizontal axis 48 which is offset relative to the transverse median plane of the basket. Like the handles of the supplementary baskets, the handle 3 comprises a part extending beyond the hinge axis 48 and this projecting part curves inwards as shown in FIGS. 21 and 22. The inwardly curving parts 49 serve to lock the basket 2 onto the carriage 1 when it is secured directly to the carriage, as shown in FIG. 7; in this case, the curved part 49 engages in a notch 52 formed in the upper end of the upright 13 or 14 (see FIG. 21). When the main basket is fixed onto the supplementary baskets 4 and 5, as shown in FIG. 12 for example, a notch 51 formed in each curved part 49 engages in the upper frame member 44 of the baskets 4 and 5 which also locks the main basket 2 in place when its handle 3 is lowered to form a grip for manoeuvring the carriage.

To ensure the locking, the main basket 2 comprises on each side a device 53 for locking the handle 3 in its lowered position, as shown in FIG. 7 for example.

The locking device is shown in front view in FIG. 23 in its locked and unlocked positions. It comprises a lever 54 pivoting about a horizontal axis on the outside of the basket. The lever comprises a notch 56 into which engages a lateral part of the handle 3 when it is in the horizontal position as shown in FIG. 7, the lever being biased by a spring (not shown) towards the basket 2 so as to engage and lock the lateral part of the handle 3.

Figure 24:
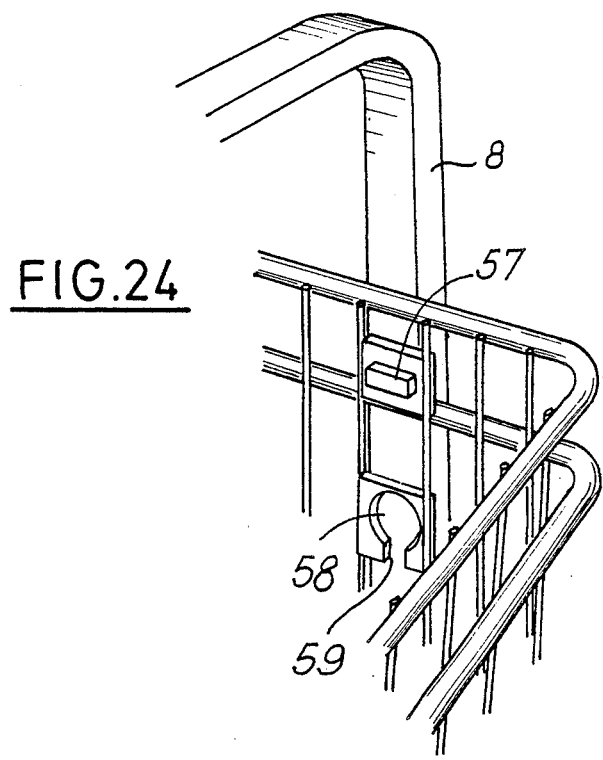
FIG. 24 is a partial perspective view of a supplementary basket.
Figure 25:
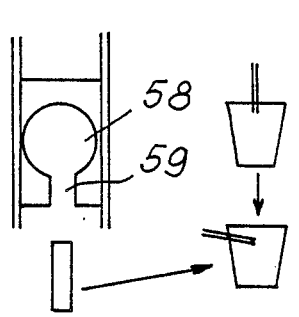
FIGS. 25 and 26 are scrap views of interconnection means for coupling the supplementary baskets togehter when they are stacked.
Figure 26:
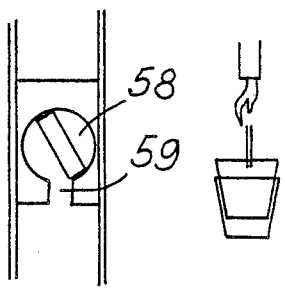

In accordance with this embodiment of the invention, the supplementary baskets are stackable one within the other and they can be locked together when they are stacked so as to form an assembly which can be carried by the uppermost basket as shown in FIG. 11. FIGS. 24 to 26 illustrate an embodiment of the device for locking the supplementary baskets together. As shown in FIG. 24, each lateral part of a basket handle comprises an elongate stub 57 projecting inwards from its hinge axis, and a female member comprising a circular opening 58 whose diameter corresponds to the length of the stub 57 is mounted on the side structure of each basket. The circular opening 58 is extended downwards by a slot 59 whose width corresponds to the width of the stub 57. The direction of the stub on the handle is such that, when the handle is lowered, the stub is slightly inclined to the vertical.

Locking of one basket to another in which it is engaged is achieved in the following way, as shown in FIGS. 25 and 26 : the underneath basket has its handle down and the handle is lifted until the stubs 57 are vertical; the slot 59 in the female member of the top basket can then accept the stub 57 of the underneath basket, which enters the circular opening 58 of the top basket. The handle of the lower basket is then dropped so that the stub 57 of the lower basket can no longer drop through the slot 59 of the top basket, as shown in FIG. 26, and the two baskets are locked together.

Figure 27:
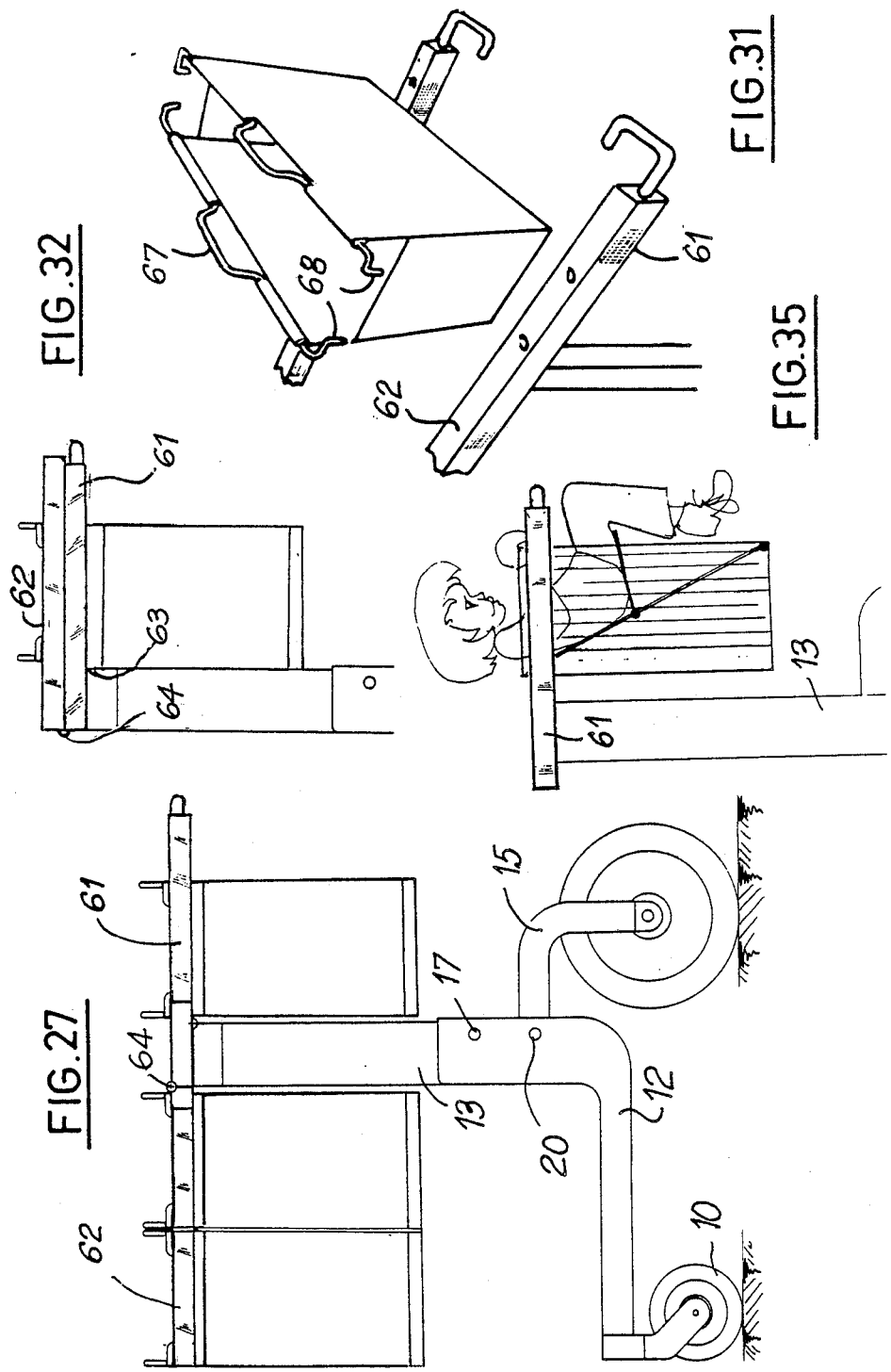
FIG. 27 is a side view of a variant of the apparatus including flexible baskets.
Figure 28:
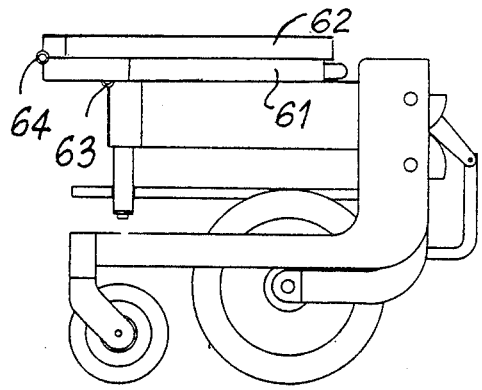
FIG. 28 is a side view of a carriage from the apparatus of FIG. 27 in folded condition.

FIGS. 27 to 35 show a variant of the apparatus in which the rigid baskets are replaced by baskets which are flexible, comprising bags of flexible material, such as plastics material. In this variant, the carriage 1 is as described above, except that it comprises lateral bars for supporting the flexible baskets. The carriage 1 comprises two support bars on each side, a lower bar 61 and an upper bar 62. Each lower bar 61 is hinged about a horizontal transverse axis 63 on the lateral upright 13 or 14; the hinge 63 is disposed at the rear side of the upright 13 or 14 and its position on the bar 61 is such that, when the support bar is in its position of use as shown in FIG. 27, it bears on the top of the upright at its front part, the rear part of the bar extending rearwards from the upright. Each upper bar 62 is hinged about a horizontal transverse axis 64 at the front end of the lower support bar 61 so as to form a knuckle-joint such that, in the usage position shown in FIG. 27, the two bars are aligned and bear on the top of the upright 13 or 14, in the folded position, as shown in FIG. 28, the upper bar is pivoted to lie on top of the lower bar and the two bars pivoted together about the hinge 63 to lie against the upright 13 or 14, which considerably reduces the height of the assembly due to the support bars, as shown in FIG. 28.

Figure 29:
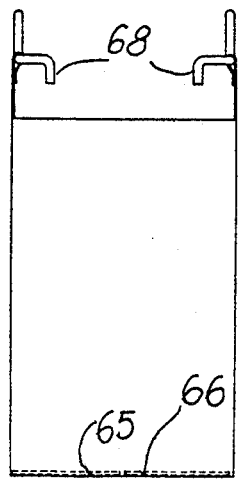
FIGS. 29 and 30 are respectively side and front views of flexible baskets from the apparatus of FIG. 27.
Figure 30:
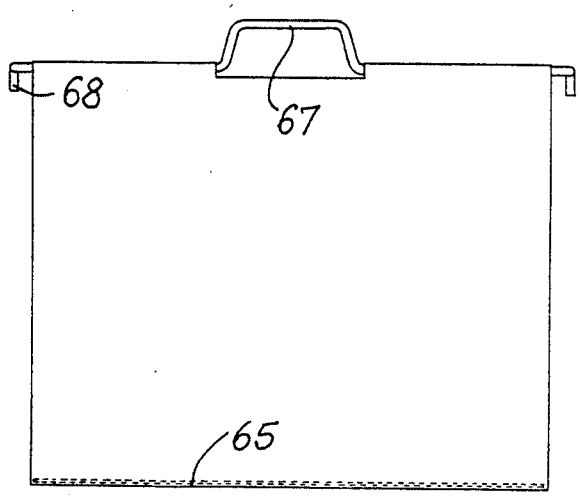

The baskets are shown in FIGS. 29 and 30 and each basket comprises a flexible parallellopiped envelope or bag having a rigid base 65 which is hinged on a longitudinal median axis 66 so that the basket can be folded up when not in use. Each basket comprises a handle 67 on both sides, each handle extending to the ends of the basket and projecting therefrom, the projecting parts 68 being hook-shaped, so that they may engage in mating holes in the upper and lower support bars 61 and 62 to secure the basket onto the carriage, as shown in FIG. 31.

As shown in FIG. 32, a single basket may be placed alone on the carriage 1; in this case, the upper support bars 62 may be folded back on top of the lower bars 61 so as to liberate completely the space above the loading platform formed by the diagonals 24 and 25 and the bands 31.

Figure 33:
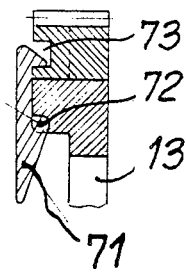
FIGS. 33 and 34 are scrap views showing locking and hinge means in the carriage of the apparatus of FIG. 27.
Figure 34:
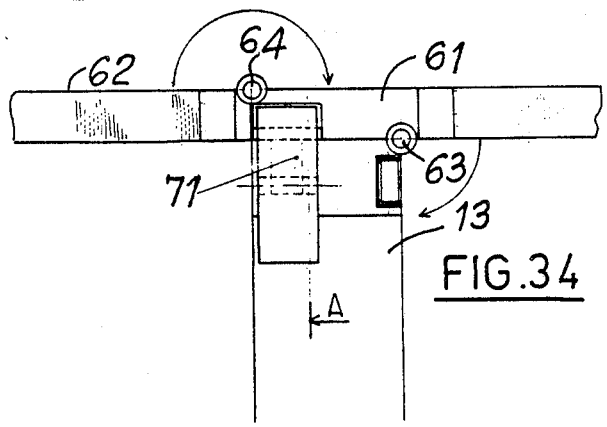

FIGS. 33 and 34 show an embodiment of a locking system for each of the lower support bars 61 for locking it cantilevered on top of the upright 13 or 14 in its usage position. The locking system comprises a hook 71 hinged on a horizontal longitudinal axis 72 on the upright 13 or 14; the hook is biased by a spring (not shown) towards the upright 13 or 14 and cooperates with a notch 73 formed in the side of the front end of the lower support bar 61.

In both variants, the main basket may be adapted to form a baby seat, as shown in FIGS. 1 and 35. In both variants, the folded apparatus can be stored in a small space and is readily transported by a single person; the load-carrying baskets are disposed in use at a convenient height so that the user does not have to bend down to load and unload them. The manipulation of the apparatus is particularly simple : in particular, the apparatus is readily folded, and unfolded for use.

FIGS. 36 to 43 illustrate another embodiment of the invention. FIGS. 36 and 37 show a carriage in the transport apparatus, comprising three main parts including a first part forming a base 81 on which are fixed pivotingly a pair of front wheels 82, a pair of rear wheel supports 83 and 84 and lateral upright 85 and 86.

The rear wheel supports 83 and 84 each bear a respective rear wheel 87 and they are secured pivotingly about a horizontal axis 88 on the base 81; the lateral uprights 85 and 86 are also hinged about a horizontal axis 89 on the base 81. The axes 88 and 89 are disposed at the rear of the base 81 and, at each side of the base, the rear wheel support and the corresponding support are coupled together so as to pivot in opposite directions. The coupling is obtained for example by respective pinion wheels solid with the wheel support and upright and meshing together; the pinion wheels (not shown) are disposed in a housing 91 mounted on the rear end of the base 81.

In this embodiment, the angle through which the wheel supports 83 and 84 pivot relative to the base 81 is twice the angle through which the uprights 85 and 86 pivot when the carriage is folded. In this way, the rear wheel supports pivot through a half-turn when the uprights pivot through a quarter-turn to fold down. The rear wheel supports 83 and 84 extend rearwards aligned with the base 81 when the carriage is in its deployed usage position and this enables the wheel-base of the carriage to be increased; this is particularly important since it has to bear a substantial load and be manoeuvred by inexperiences people.

The base 81 comprises two horizontal parallel bars 92 and 93 which are connected together by two diagonal members 94 and 95 which are connected pivotingly together at the middle 98. One end of each diagonal is hinged on a vertical axis at the front end of the respective horizontal bars 92 and 93 and the other end is secured for universal rotation to a forward extension of the rear wheel support 84 and 83 respectively.

In this embodiment of the invention, the two lateral uprights cross each other in an X shape and are hinged together at their intersection.

In this embodiment of the invention, a locking device is provided to maintain the lateral uprights on the base in their usage position; the uprights are held vertical and this forms a rigid structure. Advantageously, the locking device comprises at least one strut mounted hingingly between the base and at least one of the lateral uprights. In the example illustrated, the ends of a strut 97 are hinged to the two joints between the two diagonals 94 and 95 and between the two lateral uprights 85 and 86. As shown in the drawings, the strut 97 comprises two members 80 and 90 which are aligned in the deployed position, a hinge and locking device 114 maintaining the two members 80 and 90 aligned until unlocked, when the strut may be collapsed.

In this way, the strut 97 and intersecting lateral uprights 85 and 86 form, in the deployed position, a particularly rigid structure since it is triangulated and consequently the carriage is particular stable, which facilitates the carriage of substantial loads.

Figure 38:
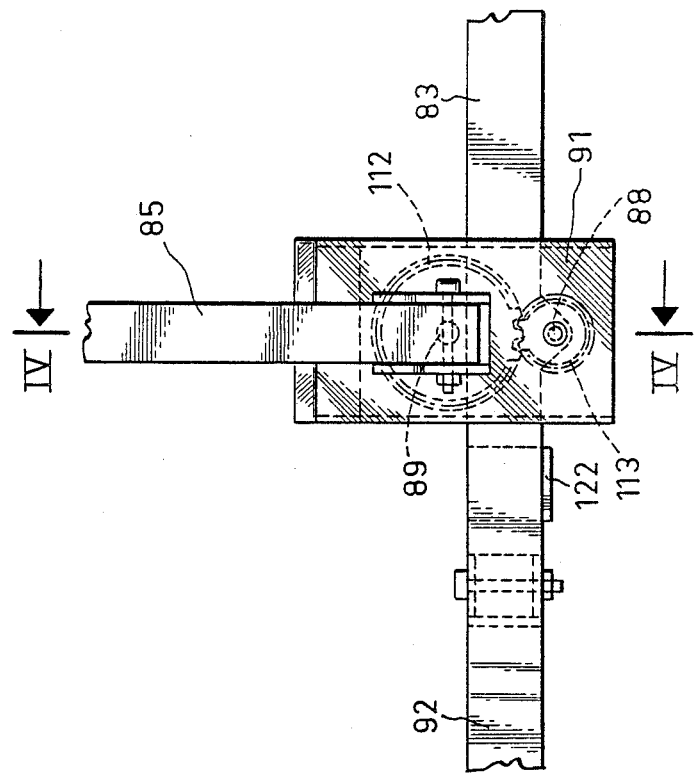
FIGS. 38 and 39 are scrap view of details of the carriage of FIG. 36.
Figure 39:
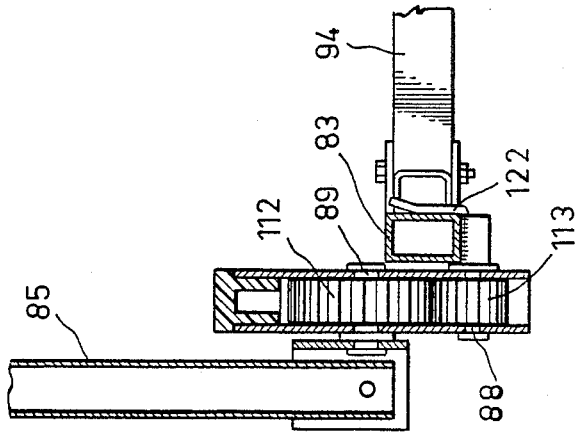

FIG. 38 shows a detail of the pivotal fixing of the wheel supports and the uprights on the base and FIG. 39 is a sectional view on the line IV—IV of FIG. 38. It will be seen that the fixing comprises a housing 91, solid with the bar 92 (or 93) and the base 81 containing the pivotal mechanism for the rear wheel support relative to the lateral upright. The double rotation described above is obtained in this example by means of meshing toothed pinion wheels 112 and 113 which are respectively solid with the corresponding lateral upright and rear wheel support; the pinion wheels are disposed within the housing 91, and to ensure that the rotation of each wheel support is twice that of the upright, the pinion 112 of the upright has twice as many teeth as the pinion 113 of the wheel support.

A vertical upright bar 115 is secured to the joint 96 at the intersection of the lateral uprights 85 and 86 and the strut 97. The central upright is maintained in the plane of the lateral uprights 85 and 86, bisecting the angle between them.

To support the removable baskets, the lateral uprights 83 and 84 and the central upright 115 each comprise at their top end horizontal basket support members 116, 117 and 118 which extend forwards and rearwards from the top end of the respective uprights. As shown in FIG. 36, the baskets can be fixed on the supports, each basket comprising a parallelopiped bag 119 of flexible material, such as synthetic material, and two horizontal handles 121 and 122 comprising respective bars disposed within the top edges of the two long sides of the bag 119; a central aperture 123 in each side wall of the bag disengages the bar so that it can be gripped to hold the basket.

Figure 43:
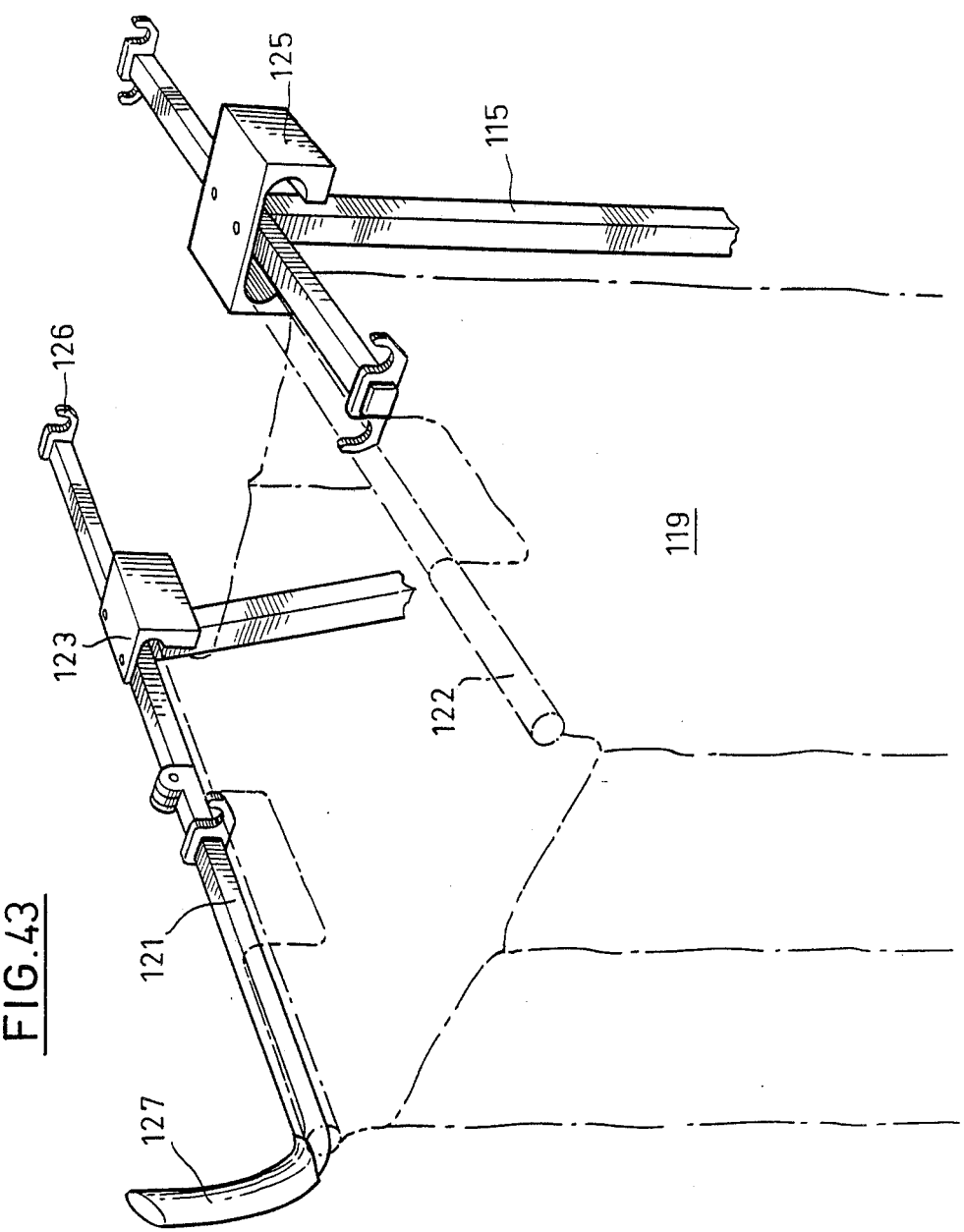
FIG. 43 is a partial perspective view of the carriage of FIG. 36 showing the fixing of baskets thereto.

FIG. 43 shows the fixing of the baskets on the carriage. The top ends of each of the uprights is provided with an inverted U-shape end-piece 123, 124 and 125 whose front and rear sides present slots into which fit the ends of the handles of a basket, the handles also being supported by a hook 126 disposed on the horizontal basket support. The end-pieces 123, 124 and 125 maintain the ends of handles 121 and 122 horizontally and vertically. As shown in FIGS. 36 and 43, the basets are supported in cantilever, the base of the basket comprising a rigid board which bears against the lateral upright 85 or 86.

The basket supports 116 and 117 advantegeously present foldable grips 127 and 128 at their rear ends; the grips 127 and 128 may be folded back onto the basket supports to reduce the size of the folded carriage. It is also advantageous for the grips to be disposed beyond the free ends of the baskets on the basket supports, so as to facilitate the hooking on and unhooking of the baskets. Preferably, the grips extend in a curve outwards of the carriage.

Figure 40:
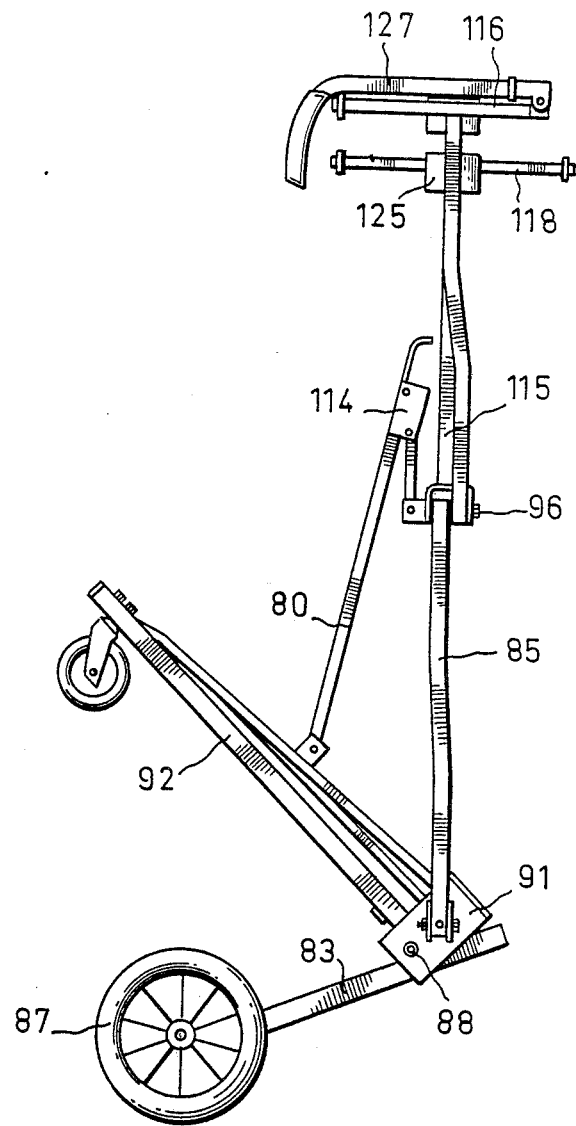
FIG. 40 is a side view of the carriage of FIG. 36 in a partially folded condition.

The folding up of the carriage is illustrated in FIGS. 40 to 42. After unlocking the joint 114, the lateral uprights are closed towards each other, the strut 97 folding to tilt the uprights forward. The fitting of the lateral uprights on the base 81 pivots through twice the angle the wheel supports 83 and 84 which moves the rear ends of the diagonals 94 and 95 rearwards, which causes the horizontal bars 92 and 93 to approach each other, the base 81 closing up. FIG. 40 shows the carriage half folded. FIG. 41 is a side view of the fully folded carriage. In this position, the rear wheels 87 are received between the respective material upright and the corresponding horizontal bar, as shown in the front view of FIG. 42. To this end, the horizontal bars 112 and 113 are offset at 130; also the lower ends of the lateral uprights 85 and 86 comprise inset portions 129, 131. In the folded position, as indicated above, the grips 127 and 128 are folded back onto the supports 116 and 117 so as to limit the height of the folded carriage. When the carriage is folded, its small size and weight make it relatively easy to instal in the boot of a car.

To increase the rigidity of the carriage in the usage position, an inwardly projecting abutment 122 is provided on each of the lateral bars 92 and 93 so as to maintain the rear wheel supports 83 and 84 aligned with the lateral bars and to limit the angle of pivoting of the rear wheel supports.

Other locking devices may be provided for locking the lateral members on the base to rigidify the carriage in its usage position.

Also, two articulated struts may be provided instead of one extending between respective horizontal bars 92, 93 and corresponding uprights 85 and 86.

Figure 44:
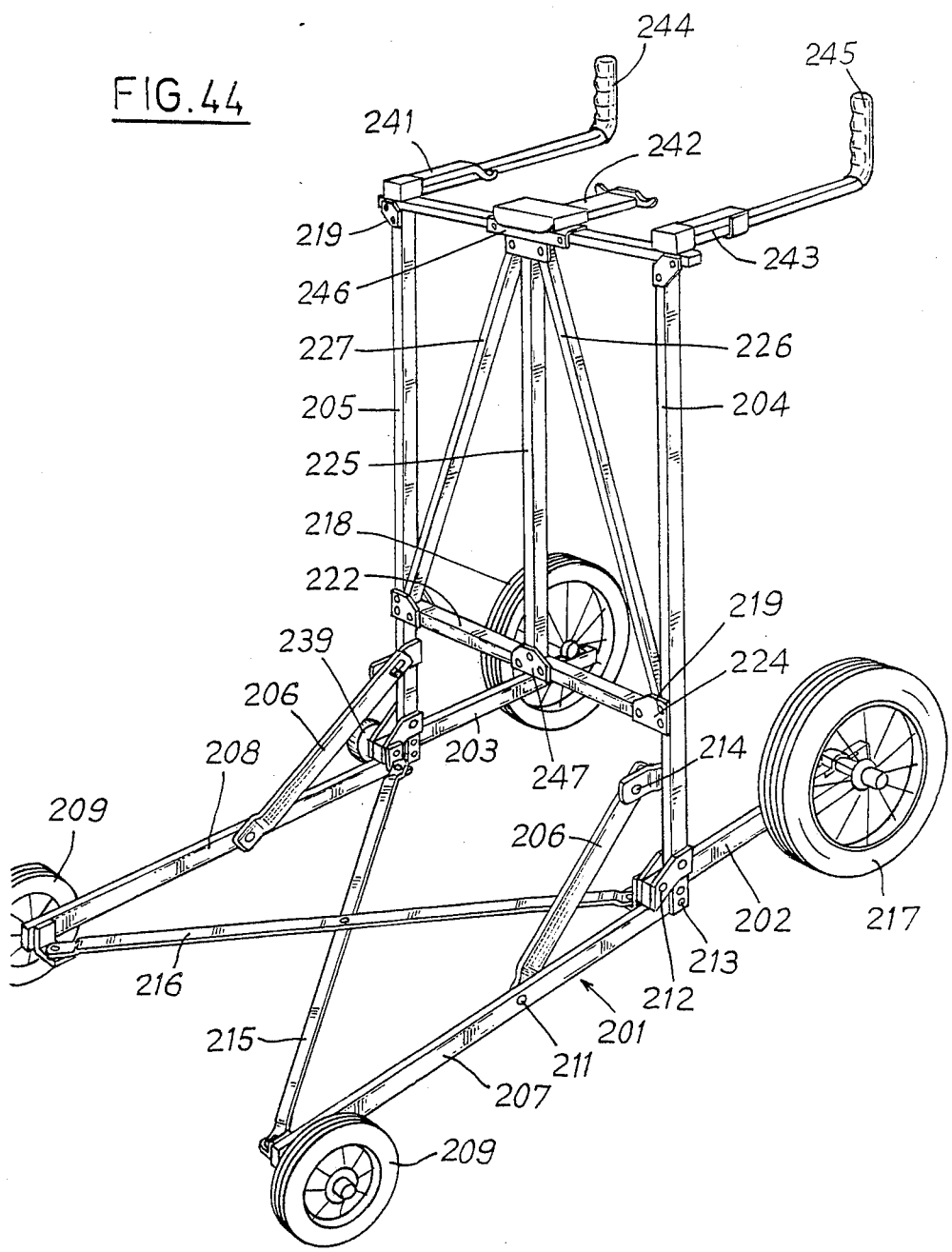
FIG. 44 is a perspective view of yet another carriage in a transport apparatus in accordance with yet another embodiment of the invention.
Figure 45:
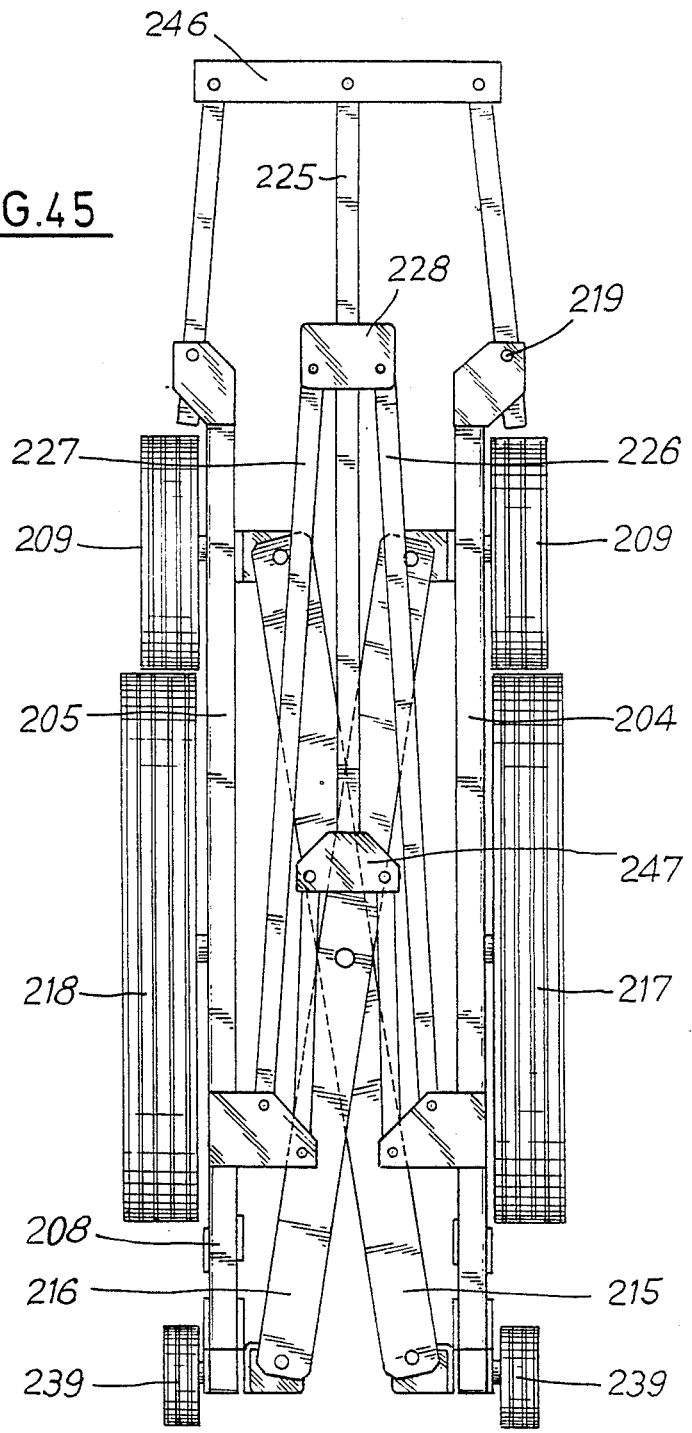
FIG. 45 is a plan view of the carriage of FIG. 44 in a folded condition.

FIGS. 44 to 46 represent yet another embodiment of the invention comprising a foldable carriage. The carriage shown comprises a base 201, two rear wheel supports 202 and 203 and two lateral uprights 204 and 205. The lateral uprights and the rear wheel supports are mounted pivotingly on the base 201 to pivot together in opposite directions and the angle of pivot of the lateral uprights is substantially half that of the rear wheel supports.

The hinge system of these three elements, the base, the rear wheel supports and the lateral uprights on each side of the carriage is shown schematically in FIG. 47, the upper part of which shows these elements unfolded and the lower part folded.

In this embodiment of the invention, the rear wheel supports 202 and 203 are hinged directly on the base 201 about a horizontal transverse axis 213 and on the lateral uprights 204, 205 about a horizontal transverse axis 212; on the other hand, the pivot between the lateral upright 204 and the base 201 is obtained through rods 206 which are mounted pivotingly at each end, one end being mounted on the base 201 to pivot about a horizontal transverse axis 211 and the other end being mounted on the lateral upright 204 or 205 to pivot about a horizontal axis 214. In this embodiment, the hinges 211 of the rods on the base, the hinges 212 of the rear wheel supports on the lateral upright and the hinges 213 of the rear wheel supports on the base are substantially aligned in that order when the carriage is unfolded as shown in the upper part of FIG. 47. This hinge system provides the rotation in opposite directions of the lateral uprights and of the rear wheel supports so that, when folded, the base, the wheel supports and the lateral uprights are disposed substantially parallel to each other as shown in the lower part of FIG. 47. It will be seen that the hinges 211 and 213 do not move on the base 201 whereas the hinges 212 move to the rear of the hinges 213.

In the embodiment of FIGS. 44 to 46, the base 201 comprises two horizontal lateral bars 207 and 208 which extend longitudinally and on which are mounted for pivoting about vertical axes two diagonal members 215 and 216 which are joined pivotingly at the middle; the diagonals are hinged at their front ends on the lateral bars 207 and 208 of the base and at their rear ends on the lateral uprights 204 and 205 so as to be displaced rearwards when the uprights are folded down forwards onto the base 201.

The lateral uprights 204 and 205, the lateral bars 207 and 208 of the base and the rear wheel supports 202 and 203 are advantageously made from rectangular section tube and, when the carriage is folded in the position shown in FIG. 45, on each side of the carriage the three tubes are superposed, in the order 204, 207, 207, 202 on one side and 203, 208, 205 on the other side. In this way the overall weight of the folded carriage is reduced to a minimum, the overall height being defined in fact by the diameter of the rear wheels 217 and 218.

Advantageously, a device for locking the carriage in its deployed position is provided which locks the hinge system described above.

As shown more particularly in FIG. 44, the two lateral uprights 205 and 206 are connected by two horizontal transverse bars 221 and 222 which are each formed of two symmetrical half bars which are connected by double joints 223 and 224 which, in this embodiment fold upwards. Each of the horizontal transverse bars 221 and 222 is mounted hingingly at its outer ends about a horizontal axis 219 on a respective mounting 223, 224 solid with the lateral upright 204 or 205.

In this embodiment, the two double joints are connected by a central vertical rod 225 and, in addition, two oblique traverses 226 are connected hingingly at their lower ends to the lateral uprights through the mountings 223, 224 and at their upper ends to a part 228 which slides on the central rod 225.

The carriage shown in FIGS. 44 and 45 may advantageously be provided with a foldable baby seat fixed permanently thereon. The baby seat comprises two horizontal bars 231, 232 which are mounted to pivot about a horizontal transverse axis on one of the oblique traverses 226 and 227. The horizontal bars support at their outer ends vertical bars 333, 334 which are hinged the outer ends of the horizontal bars 331, 332. The baby seat also comprises a band of flexible material 235 which forms the back and seat, and is fixed at one end to the oblique traverses 226, 227 and is extended at its other end by a central retaining strap 236 whose free end is fixed to a flexible strap 238 connecting the free ends of the two uprights 233 and 234.

Advantageously, the hinge system on each side of the carriage comprises a small wheel or castor to aid in transporting the carriage when folded in the position shown in FIG. 45.

To fix the removable baskets, the lateral uprights 204 and 205 and the central rod 225 comprise at their top ends horizontal basket supports 241, 242 and 243 which extend, on each side of the top ends of the uprights 204 and 205 and the central rod 225. The basket supports 241, 243 which are mounted on the lateral uprights 204 and 205 advantageously comprise foldable grips 244, 245 for manoeuvring the carriage in its usage position.

I claim:

1. Apparatus for the carriage and transport of goods having a folded condition and a deployed condition, the apparatus comprising base means presenting first and second end portions, at least one first wheel mounted to support said first end portion of said base means, at least two second wheels, wheel support members extending pivotably outwards from said base means to connect said second wheels to said second portion of said base means whereby said second wheels support said second portion of said base means in said deployed condition, at least two lateral upright members projecting upwards from said second end portion of said base means in said deployed condition and mounted pivotably to said second end portion, and coupling means for coupling said lateral upright members with said wheel support members respectively for pivoting in opposite directions at relative speeds such that when said upright members are pivoted through a first angle to a position juxtaposed with said first end portion of said base means in said folded condition, said wheel support member are pivoted through a second angle in the opposite direction to a position relative to said base member to a position juxtaposed with said base means said second angle is substantially twice as big as said first angle.

2. Apparatus as claimed in claim 1 wherein said coupling means comprises hinge means by which said wheel support members are mounted pivotably on said base means and on said lateral upright members respectively, and rod members connecting said upright members pivotably with said base means, said hinge means being substantially aligned with the connection of said rod members with said base means in said deployed condition.

3. Apparatus as claimed in claim 1 wherein said coupling means comprise meshing gear means connected with respective ones of said lateral upright members and wheel support members, said lateral upright members and said wheel support members being mounted pivotably on said base means.

4. Apparatus as claimed in claim 2 wherein said base means comprise first and second lateral bars, first and second diagonal members joined pivotably at the middle and each being connected pivotably at one end to said lateral bars and at the other end to said lateral upright members respectively.

5. Apparatus as claimed in claim 1 wherein said lateral upright members are connected together by at least one foldable bar which extends generally horizontally in said deployed condition, said foldable bar including a central hinged part by which said foldable bar may be folded in said folded condition.

6. Apparatus as claimed in claim 5 wherein said lateral upright members are connected by two of said foldable bars, said apparatus including a central upright member connecting said central hinged parts, whereby said foldable bars may be folded together.

7. Apparatus as claimed in claim 5 wherein said at least one foldable bar is foldable upwards.

8. Apparatus as claimed in claim 6 and including first and second oblique traverses connected pivotably at one end with said lateral upright members respectively adjacent said base means and slider means mounted slidably on said central upright member and connected with the other ends of said traverses.

9. Apparatus as claimed in claim 8 and including baby seat means comprising first and second horizontal bars connected pivotably about a horizontal axis to said oblique traverses respectively at one end, and uprights connected hingingly to the other ends of said bars, and flexible bands connecting said horizontal bars and said uprights whereby to define a seat and a back.

10. Apparatus as claimed in claim 1 and including at least one further wheel mounted at said second end portion of said base means for supporting said second end portion in said folded condition.

11. Apparatus as claimed in claim 1 and including locking means for locking said lateral upright members in position in said deployed condition.

12. Apparatus as claimed in claim 11 wherein said locking means secures said lateral upright members relative to said base means in said deployed condition.

13. Apparatus as claimed in claim 1 and including basket support members connected pivotably to upper portions of said upright members, said basket support members projecting generally horizontally from said upright members in said deployed condition for supporting at least one basket.

14. Apparatus as claimed in claim 13 wherein said basket support members present grip means by which said apparatus may be grasped.

* * * * *

UNITED STATES PATENT AND TRADEMARK OFFICE
CERTIFICATE OF CORRECTION

PATENT NO. : 4,813,701
DATED : March 21, 1989
INVENTOR(S) : Denis Balland

It is certified that error appears in the above-identified patent and that said Letters Patent is hereby corrected as shown below:

In Column 1, line 61, change "developed" to --deployed--.

In Column 2, line 44, after "store" insert --;--.

In Column 3, line 8, change "view" to --views--.

In Column 3, line 20, change "togehter" to --together--.

In Column 3, line 41, change "view" to --views--.

In Column 4, line 1, after "which" insert --is--.

In Column 9, line 56, change "basets" to --baskets--.

In Column 11, line 18, delete "207", second occurrence.

In Column 11, line 20, change "weight" to --height--.

In Column 12, claim 1, line 22, delete "to a position".

UNITED STATES PATENT AND TRADEMARK OFFICE
CERTIFICATE OF CORRECTION

PATENT NO. : 4,813,701

DATED : March 21, 1989

INVENTOR(S) : Denis Balland

It is certified that error appears in the above-identified patent and that said Letters Patent is hereby corrected as shown below:

In Column 12, claim 3, line 35, change "comprise" to --comprises--.

Signed and Sealed this

Twentieth Day of February, 1990

Attest:

JEFFREY M. SAMUELS

*Attesting Officer*     *Acting Commissioner of Patents and Trademarks*